United States Patent
Nishikawa et al.

(10) Patent No.: US 8,385,277 B2
(45) Date of Patent: Feb. 26, 2013

(54) BASE STATION APPARATUS, MOBILE STATION, RADIO COMMUNICATION SYSTEM, AND COMMUNICATION CONTROL METHOD

(75) Inventors: Daisuke Nishikawa, Yokosuka (JP); Hiroyuki Ishii, Yokosuka (JP); Teruo Kawamura, Yokosuka (JP); Kenichi Higuchi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 580 days.

(21) Appl. No.: 12/526,654

(22) PCT Filed: Feb. 12, 2008

(86) PCT No.: PCT/JP2008/052258
§ 371 (c)(1),
(2), (4) Date: Nov. 11, 2009

(87) PCT Pub. No.: WO2008/099807
PCT Pub. Date: Aug. 21, 2008

(65) Prior Publication Data
US 2010/0091708 A1    Apr. 15, 2010

(30) Foreign Application Priority Data

Feb. 15, 2007  (JP) ................................. 2007-035526
Mar. 23, 2007  (JP) ................................. 2007-077900

(51) Int. Cl.
 H04J 1/16    (2006.01)
 H04J 1/00    (2006.01)
 H04J 3/14    (2006.01)
 H04L 1/00    (2006.01)
 H04L 5/14    (2006.01)
 H04W 4/00    (2009.01)

(52) U.S. Cl. ........ 370/329; 370/231; 370/281; 370/295; 370/328; 370/334; 370/338

(58) Field of Classification Search ................. None
See application file for complete search history.

(56) References Cited

U.S. PATENT DOCUMENTS

2007/0254679 A1* 11/2007 Montojo et al. ............ 455/458
2008/0043708 A1*  2/2008 Muharemovic et al. ...... 370/348

FOREIGN PATENT DOCUMENTS

JP    11-252040 A     9/1999
JP    2005-354326 A   12/2005

(Continued)

OTHER PUBLICATIONS

Nomor 3GPP Newsletter—2007#08; "Overview LTE PHY: Part 2—LTE Phy Signals/Channels"; Eiko Seidel and Volker Pauli; Feb. 10, 2007 (13 pages).*

(Continued)

Primary Examiner — John Blanton
Assistant Examiner — Diane Lo
(74) Attorney, Agent, or Firm — Osha Liang LLP

(57) ABSTRACT

In a radio communication system including a mobile station and a base station apparatus for communicating with the mobile station according to a SC-FDMA scheme in uplink, the mobile station includes a transmitting unit configured to transmit at least one of a first signal and a second signal; and a Sounding RS transmitting unit configured to determine a transmission band for a Sounding Reference Signal (Sounding RS) based on mapping information of at least one of the first signal and the second signal.

20 Claims, 13 Drawing Sheets

FOREIGN PATENT DOCUMENTS

JP          2006-345274 A    12/2006

OTHER PUBLICATIONS

International Search Report w/translation from PCT/JP2008/052258 dated May 20, 2008 (4 pages).
Written Opinion from PCT/JP2008/052258 dated May 20, 2008 (4 pages).
3GPP TSG RAN WG1 Meeting #50; R1-073700; "PUCCH Structure Considering Sounding RS Transmission in E-UTRA Uplink"; NTT DoCoMo, Mitsubishi Electric, NEC, Sharp; Athens, Greece; Aug. 20-24, 2007 (3 pages).
3GPP TSG RAN WG1 Meeting #50; R1-073690; "PRACH Multiplexing Method and Slot Configuration for E-UTRA Uplink"; NTT DoCoMo, Mitsubishi Electric, NEC, Sharp; Athens, Greece; Aug. 20-24, 2007 (4 pages).
3GPP TSG RAN WG1 Meeting #47bis; R1-070090; "Necessity of Multiple Bandwidths for Sounding Reference Signals"; NTT DoCoMo, Fujitsu, Mitsubishi Electric, NEC, Panasonic; Sharp; Sorrento, Italy; Jan. 15-19, 2007 (10 pages).
3GPP TSG RAN1 #47-bis; R1-070437; "Proposed Structure for UL ACK and CQI"; Qualcomm Europe; Sorrento, Italy; Jan. 15-19, 2007 (3 pages).
3GPP TR 25.814, V7.1.0; "Physical Layer Aspects for Evolved Universal Terrestrial Radio Access (UTRA)"; Sep. 2006 (132 pages).

* cited by examiner

BASE STATION APPARATUS, MOBILE STATION, RADIO COMMUNICATION SYSTEM, AND COMMUNICATION CONTROL METHOD

TECHNICAL FIELD

The present invention relates to a LTE (Long Term Evolution) system and specifically relates to a base station apparatus, a mobile station, and a communication control method.

BACKGROUND ART

A communication system as a successor of W-CDMA and HSDPA, namely, a Long Term Evolution (LTE) system has been considered by a W-CDMA standardization organization 3GPP. As a radio access scheme, Orthogonal Frequency Division Multiplexing (OFDM) is under consideration for downlink, and Single-Carrier Frequency Division Multiple Access (SC-FDMA) is under consideration for uplink (see 3GPP TR 25.814 (V7.0.0), "Physical Layer Aspects for Evolved UTRA", June 2006, for example).

In OFDM, a frequency band is divided into plural narrow frequency bands (sub-carriers), and data are placed on the respective divided frequency bands to carry out transmission. The sub-carriers are densely arranged in a frequency direction, allowing the sub-carriers to be partly overlapped without causing interference, thereby realizing high speed transmission and improving frequency usage efficiency.

In SC-FDMA, a frequency band is divided into plural narrow bands, and different narrow bands are used by different mobile stations, so that interference between the mobile stations can be reduced. According to SC-FDMA, which is characterized in that variations in the transmission power are reduced, a large coverage area and low energy consumption can be realized.

In LTE, one or more physical channels for both uplink and downlink are shared by plural mobile stations. The channel which is shared by plural mobile stations is typically called a shared channel. In LTE, a Physical Uplink Shared Channel (PUSCH) is used in uplink and a Physical Downlink Shared Channel (PDSCH) is used in downlink.

In uplink, a control channel (PUCCH: Physical Uplink Control Channel) and a random access channel (PRACH: Physical Random Access Channel) are used in addition to the shared channel. Furthermore, Demodulation Reference Signals (Demodulation RSs), Sounding Reference Signals (Sounding RSs), and so on are transmitted as pilot signals.

The PUCCH includes two types, i.e., a channel to be time-multiplexed with the PUSCH and a channel to be frequency-multiplexed with the PUSCH.

In the communication system which uses the shared channel, scheduling is needed to determine to which mobile station the shared channel is assigned for each subframe. Scheduling is performed based on information such as communication quality derived from the Sounding RSs.

In LTE uplink, the Sounding RSs are transmitted to mobile stations with various bandwidths in the whole system band. The Sounding RSs are time-multiplexed with the PUSCH.

DISCLOSURE OF INVENTION

Problem(s) to be Solved by the Invention

However, the above-mentioned technology has the following problem.

Specifically, in LTE uplink, the Sounding RS is transmitted in the same time slot as the PRACH and the PUCCH. As a result, interference occurs when the transmission band for the Sounding RS overlaps with the transmission bands for the PUCCH and the PRACH.

In order to solve this problem, it is a general object of the present invention to provide a base station apparatus, a mobile station, a radio communication system, and a communication control method to appropriately control transmission of the Sounding RS when the transmission band for the Sounding RS overlaps with the transmission bands for the PUCCH and the PRACH.

Means for Solving the Problem(s)

In one aspect of the present invention, there is provided a radio communication system including a mobile station and a base station apparatus for communicating with the mobile station according to a SC-FDMA (Single-Carrier Frequency Division Multiple Access) scheme in uplink, the mobile station including:

a transmitting unit configured to transmit at least one of a first signal and a second signal; and a Sounding RS transmitting unit configured to determine a transmission band for a Sounding Reference Signal (Sounding RS) based on mapping information of at least one of the first signal and the second signal.

The radio communication system can appropriately control transmission of the Sounding RS when the transmission band for the Sounding RS overlaps with the transmission bands for the PUCCH and the PRACH.

In another aspect of the present invention, there is provided a radio communication system including a mobile station and a base station apparatus for communicating with the mobile station according to a SC-FDMA scheme in uplink, including:

a substituting unit configured to use a SIR (Signal-to-Interference ratio) for an adjacent RB (Resource Block) or an immediately preceding RB in which the Sounding RS is transmitted in place of a SIR for a RB in which the sounding RS is not transmitted.

The radio communication system can appropriately control transmission of the Sounding RS when the transmission band for the Sounding RS overlaps with the transmission bands for the PUCCH and the PRACH.

In another aspect of the present invention, there is provided a radio communication system including a mobile station and a base station apparatus for communicating with the mobile station according to a SC-FDMA scheme in uplink, wherein:

a Sounding RS is not transmitted, when all or part of a transmission band for the Sounding RS overlaps all or part of a transmission band for a first signal or a second signal.

In another aspect of the present invention, there is provided a base station apparatus in a radio communication system including a mobile station and the base station apparatus for communicating with the mobile station according to a SC-FDMA scheme in uplink, including:

a receiving unit configured to receive a first signal and a second signal;

a Sounding RS receiving unit configured to receive a Sounding RS whose transmission band is determined based on mapping information of the first signal and the second signal.

In another aspect of the present invention, there is provided a base station apparatus in a radio communication system including a mobile station and the base station apparatus for communicating with the mobile station according to a SC-FDMA scheme in uplink, including:

a receiving unit configured to receive either a first signal or a third signal when reception opportunities for the first signal and the third signal are provided in a same subframe.

In another aspect of the present invention, there is provided a base station apparatus in a radio communication system including a mobile station and the base station apparatus for communicating with the mobile station according to a SC-FDMA scheme in uplink, comprising:

a receiving unit configured to receive part of a first signal and a third signal when reception opportunities for the first signal and the third signal are provided in a same subframe.

In another aspect of the present invention, there is provided a mobile station in a radio communication system including the mobile station and a base station apparatus for communicating with the mobile station according to a SC-FDMA scheme in uplink, including:

a transmitting unit configured to transmit a first signal and a second signal; and a Sounding RS transmitting unit configured to transmit a Sounding RS whose transmission band is determined based on mapping information of the first signal and the second signal.

In another aspect of the present invention, there is provided a mobile station in a radio communication system including the mobile station and a base station apparatus for communicating with the mobile station according to a SC-FDMA scheme in uplink, including:

a transmitting unit configured to transmit either a first signal or a third signal when transmission opportunities for the first signal and the third signal are provided in a same subframe.

In another aspect of the present invention, there is provided a mobile station in a radio communication system including the mobile station and a base station apparatus for communicating with the mobile station according to a SC-FDMA scheme in uplink, including:

a transmitting unit configured to transmit part of a first signal and a third signal when transmission opportunities for the first signal and the third signal are provided in a same subframe.

In another aspect of the present invention, there is provided a communication control method in a radio communication system including a mobile station and a base station apparatus for communicating with the mobile station according to a SC-FDMA scheme in uplink, including the steps of:

determining, by the mobile station, a frequency band for a Sounding RS based on mapping information of a first signal and a second signal; and transmitting, by the mobile station, at least one of the first signal, the second signal, and the Sounding RS.

Advantageous Effect of the Invention

According to an embodiment of the present invention, a base station apparatus, a mobile station, a radio communication system, and a communication control method are achieved, in which transmission of the Sounding RS is appropriately controlled when the transmission band for the Sounding RS overlaps with the transmission bands for the PUCCH and the PRACH.

DETAILED DESCRIPTION OF THE PREFERRED EMBODIMENTS

Figure 1:
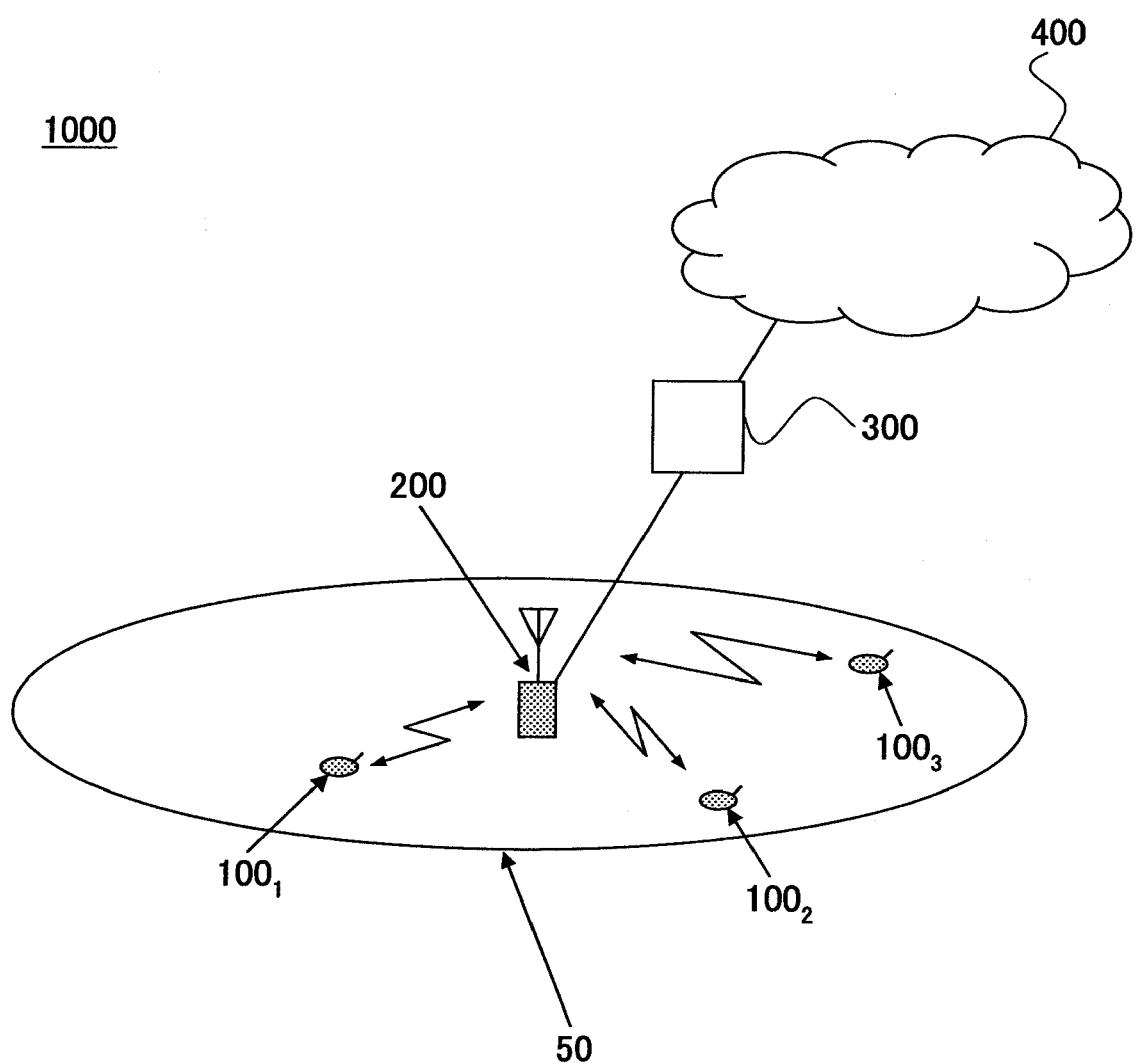
FIG. 1 shows a schematic diagram illustrating a configuration of a radio communication system according to an embodiment of the present invention.

Description of Notations 50 cell
$100_1$, $100_2$, $100_3$, $100_n$ mobile station
102 transceiving antenna
104 amplification unit
106 transceiving unit
108 baseband signal processing unit
110 call processing unit
112 application unit
200 base station apparatus
202 transceiving antenna
204 amplification unit
206 transceiving unit
208 baseband signal processing unit
210 call processing unit
212 transmission path interface
300 access gateway apparatus
400 core network
1000 radio communication system

BEST MODE OF CARRYING OUT THE INVENTION

With reference to the accompanying drawings, preferred embodiments of the present invention are described below.

Throughout the drawings, corresponding elements are referenced by the same reference numerals and repetitive explanations are omitted.

Referring to FIG. 1, a radio communication system is explained below in which a base station apparatus according to an embodiment of the present invention is applied.

A radio communication system 1000, to which Evolved UTRA and UTRAN (also known as: Long Term Evolution (LTE) or Super 3G) is applied, includes a base station apparatus (eNB: eNodeB) 200 and plural mobile stations (UE: User Equipment) $100_n$ ($100_1$, $100_2$, $100_3$, ..., $100_n$, n: an integer more than zero). The base station apparatus 200 is connected to an upper layer station, for example, an access gateway apparatus 300, and the access gateway apparatus 300 is connected to a core network 400. The mobile stations $100_n$ communicate with the base station apparatus 200 in a cell 50 under Evolved UTRA and UTRAN.

In the following, the mobile stations $100_1$, $100_2$, $100_3$, ..., $100_n$ are referred to as the mobile station $100_n$, unless otherwise noted, because they have the same configuration, function, and condition.

The radio communication system 1000 employs Orthogonal Frequency Division Multiple Access (OFDMA) for downlink and Single-Carrier Frequency Division Multiple Access (SC-OFDMA) for uplink as radio access schemes. As stated above, in OFDM, a frequency band is divided into plural narrow frequency bands (sub-carriers), and data are placed on the respective divided frequency bands to carry out transmission. In SC-FDMA, a frequency band is divided, and different frequency bands are used by different mobile stations to carry out transmission, so that interference between the mobile stations can be reduced.

Communication channels in LTE are explained below.

In downlink, a Physical Downlink Shared Channel (PDSCH) shared by the mobile stations $100_n$ and a downlink control channel (PDCCH: Physical Downlink Control Channel) are used. In downlink, transport format information and user identification of the user to which PDSCH is transmitted, transport format information and user identification of the user to which Physical Uplink Shared Channel (PUSCH) is transmitted, acknowledgement information (HARQ ACK information) of the PUSCH, and so on are provided on the downlink control channel, and user data are transmitted on the PDSCH. The channel on which the acknowledgement information is transmitted is called a Physical Hybrid-ARQ Indicator Channel (PHICH).

In uplink, the PUSCH shared by the mobile stations $100_n$ and an uplink control channel (PUCCH: Physical Uplink Control Channel) are used.

In uplink, PDSCH scheduling, downlink quality information (CQI: Channel Quality Indicator) to be used for Adaptive Modulation and Coding (AMC) and Transmission Power Control (TPC), and acknowledge information of the PDSCH are transmitted on the uplink control channel. In addition, user data are transmitted on the PUSCH.

Figure 2:
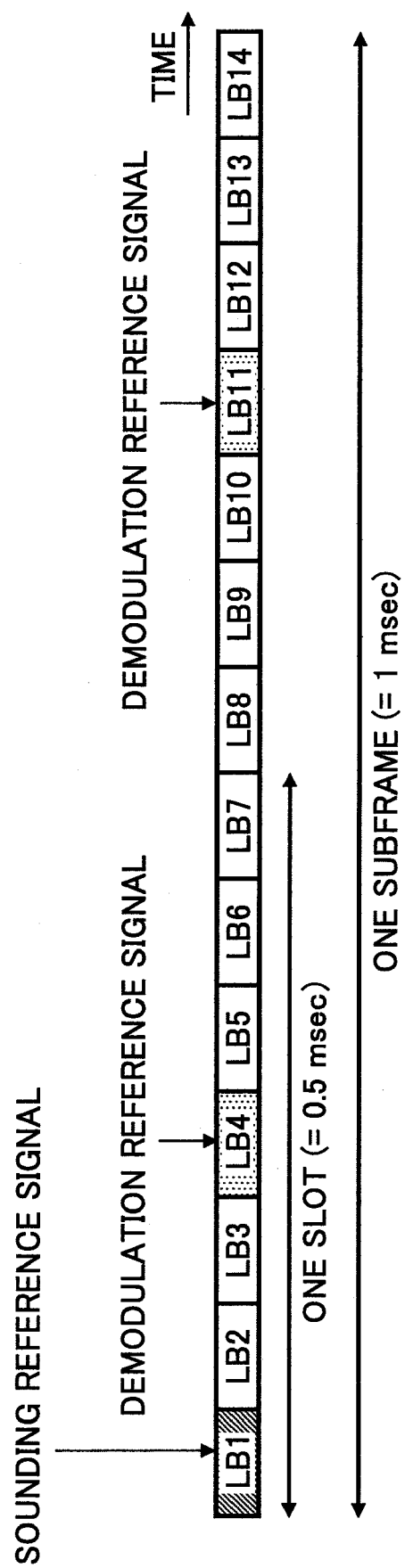
FIG. 2 shows a configuration of a subframe and slots according to an embodiment of the present invention.

In uplink transmission, seven long blocks (LBs) are used for each slot. Because one subframe includes two slots, one subframe includes fourteen long blocks as shown in FIG. 2. Reference signals for data demodulation (i.e., Demodulation Reference Signals) are mapped to two long blocks of the fourteen long blocks. A reference signal for sounding (i.e., Sounding Reference Signal), which is to be used for determining a transmission format of the PUSCH for uplink AMC, TPC, and scheduling is transmitted through one long block of the fourteen long blocks except for the long blocks to which the Demodulation Reference Signals are mapped. The Sounding Reference Signal may not be mapped to every subframe. In the long block in which the Sounding Reference Signal is transmitted, the Sounding Reference Signals from plural mobile stations are multiplexed according to Code Division Multiplexing (CDM). The Demodulation Reference Signals are mapped to the fourth long block and the eleventh long block in the subframe, for example. The Sounding Reference Signal is mapped to the first long block in the subframe, for example. The long blocks may be called SC-FDMA symbols.

In uplink, each mobile station $100_n$ transmits signals in terms of resource blocks (RBs) in the frequency direction and in terms of subframes in the time direction. In LTE, the frequency band for one resource block is equal to 180 kHz. The number of RBs is equal to 25 for the system bandwidth of 5 MHz, is equal to 50 for the system bandwidth of 10 MHz, and is equal to 100 for the system bandwidth of 20 MHz.

Figure 3:
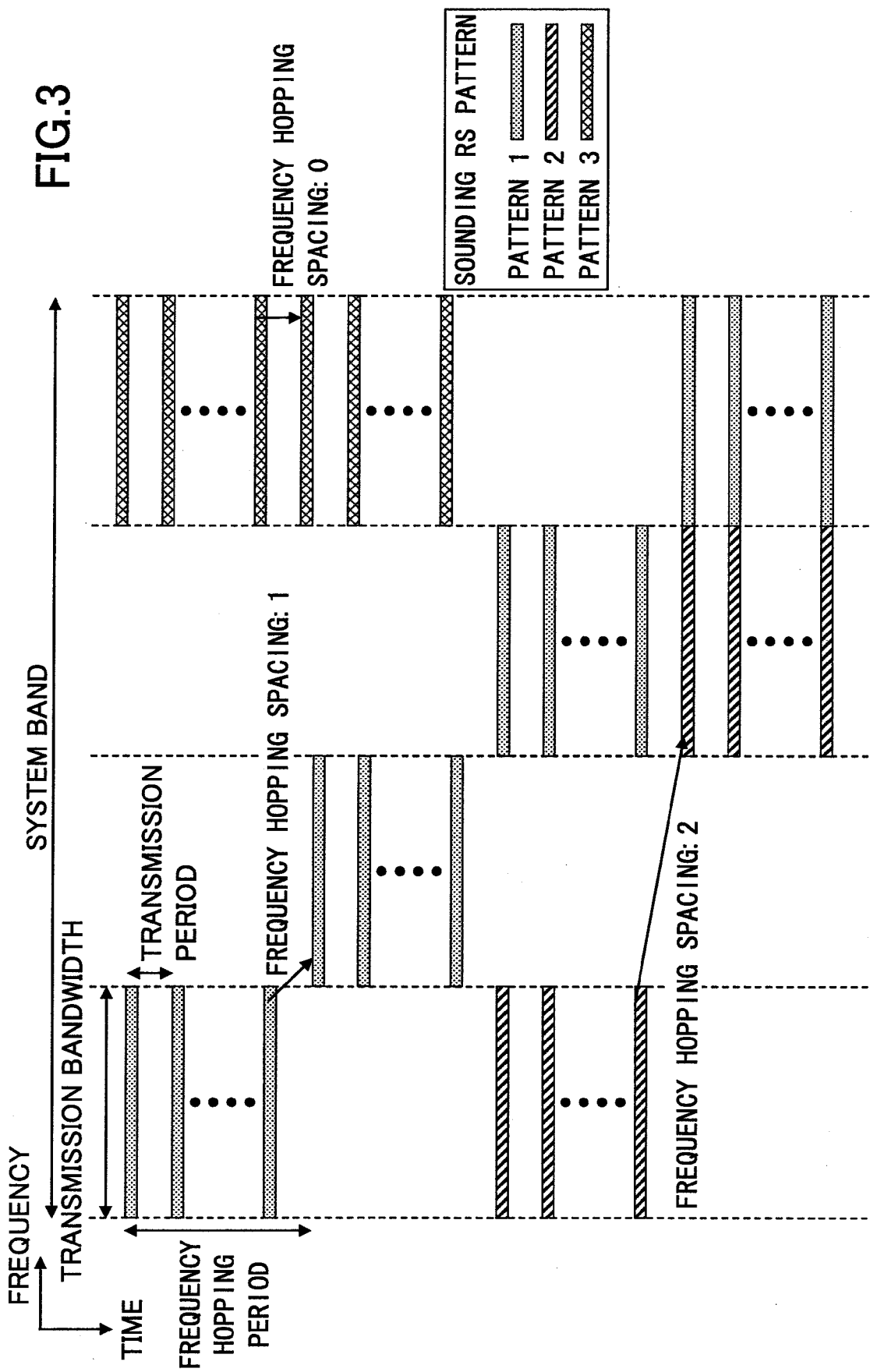
FIG. 3 shows a transmission band for a Sounding RS according to an embodiment of the present invention.

Each mobile station $100_n$ transmits the Sounding RS with one or more RBs. As shown in FIG. 3, the transmission band for the Sounding RS is uniquely determined by a transmission bandwidth, a transmission period, a frequency hopping period, a frequency hopping spacing, and so on, for example. It should be noted that the transmission bandwidth, the transmission period, the frequency hopping period, and the frequency hopping spacing for each mobile station are managed by the base station apparatus 200, for example, and they are transmitted from the base station apparatus 200 to the mobile station $100_n$ by means of an RRC message at the beginning of communication.

For the pattern 1 in FIG. 3, the mobile station transmits Sounding RSs several times in the time direction based on the frequency hopping period. Then the mobile station changes the transmission band to the adjacent frequency band, and again transmits Sounding RSs several times in the time direction based on the frequency hopping period. The distance between the original transmission band to the adjacent frequency band corresponds to the frequency hopping spacing.

Figure 4:
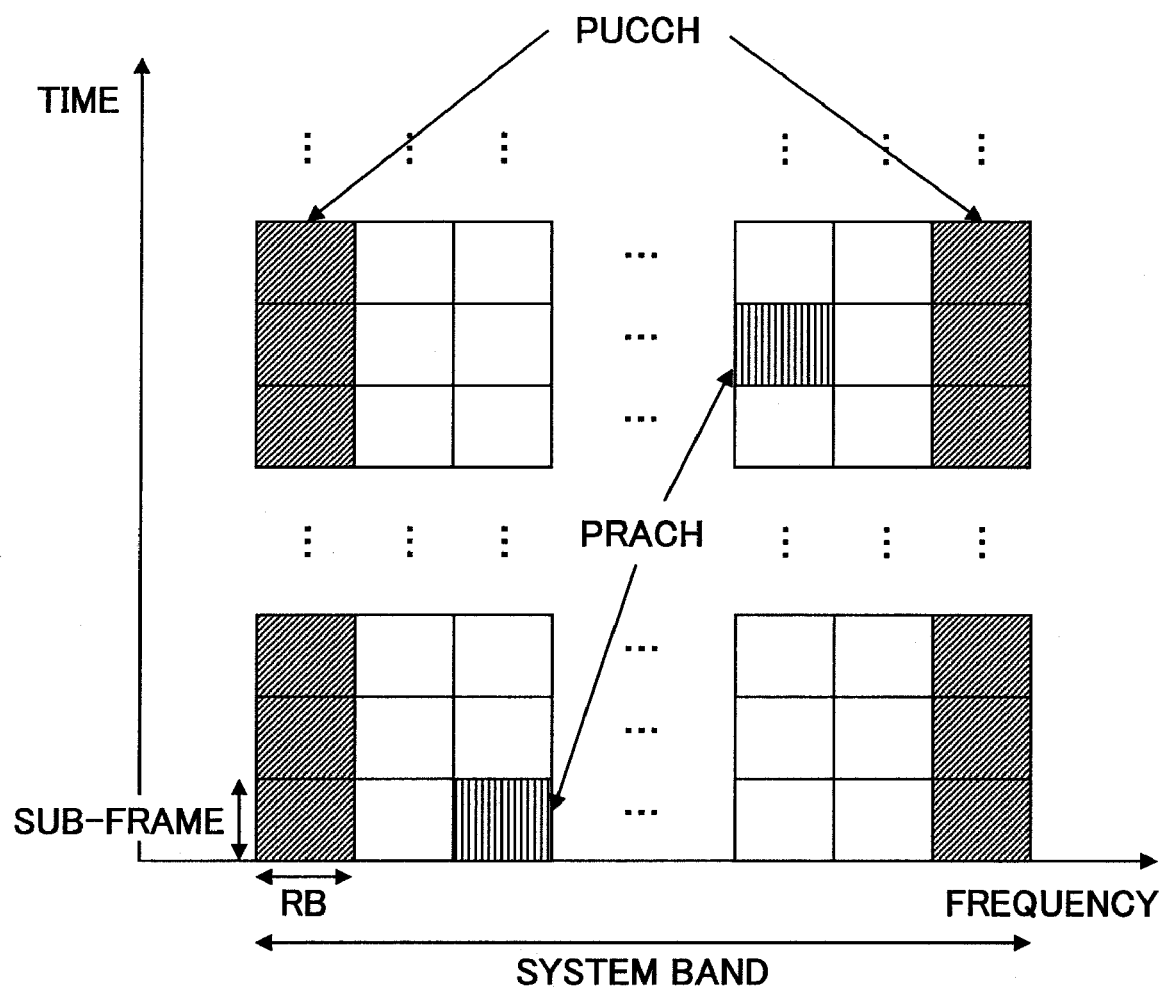
FIG. 4 shows uplink mapping according to an embodiment of the present invention.

As shown in FIG. 4, the PUCCH which is frequency-multiplexed with the PUSCH is mapped to RBs at both ends of the system band. Although FIG. 4 shows the case where one RB is allocated to each end of the system band, two or more RBs may be allocated to each end of the system band. Information about resources on the PUCCH, such as resource IDs, transmission periods, and transmission timings for the PUCCH, to be used by the respective mobile stations $100_n$ to transmit CQI may be managed by the base station apparatus 200, for example, and the information may be transmitted from the base station apparatus 200 to the mobile station $100_n$ by means of an RRC message or broadcast information.

As shown in FIG. 4, six RBs as a frequency resource are allocated to the PRACH. In addition, one subframe of ten subframes as a time resource is allocated to the PRACH. For example, the frequency band for the PRACH is defined in the first subframe within one radio frame (10 ms) including ten subframes.

Two or more PRACHs, each of which uses six RBs, may be defined in one subframe. Specifically, when two PRACHs are defined in one subframe, twelve RBs in total are allocated to the PRACHs.

Mapping information of the PUCCH and the PRACH are typically determined by the base station apparatus 200. Alternatively, the mapping information may be defined in advance as a predetermined parameter in the radio communication system 1000. In either case, information about which subframes and which RBs the PUCCH and the PRACH use for transmission is provided to the mobile station $100_n$ on the broadcast channel or the like, for example. Namely, the mobile station $100_n$ knows information about which subframes and which RBs the PUCCH and the PRACH use for transmission.

The Sounding RS is transmitted with the frequency band which does not include the frequency band for the PUCCH (the Sounding RS is transmitted with the frequency band to which the PUCCH is not mapped or allocated). It should be noted that the transmission band for the Sounding RS may be divided into one or more transmission bands.

Figure 5:
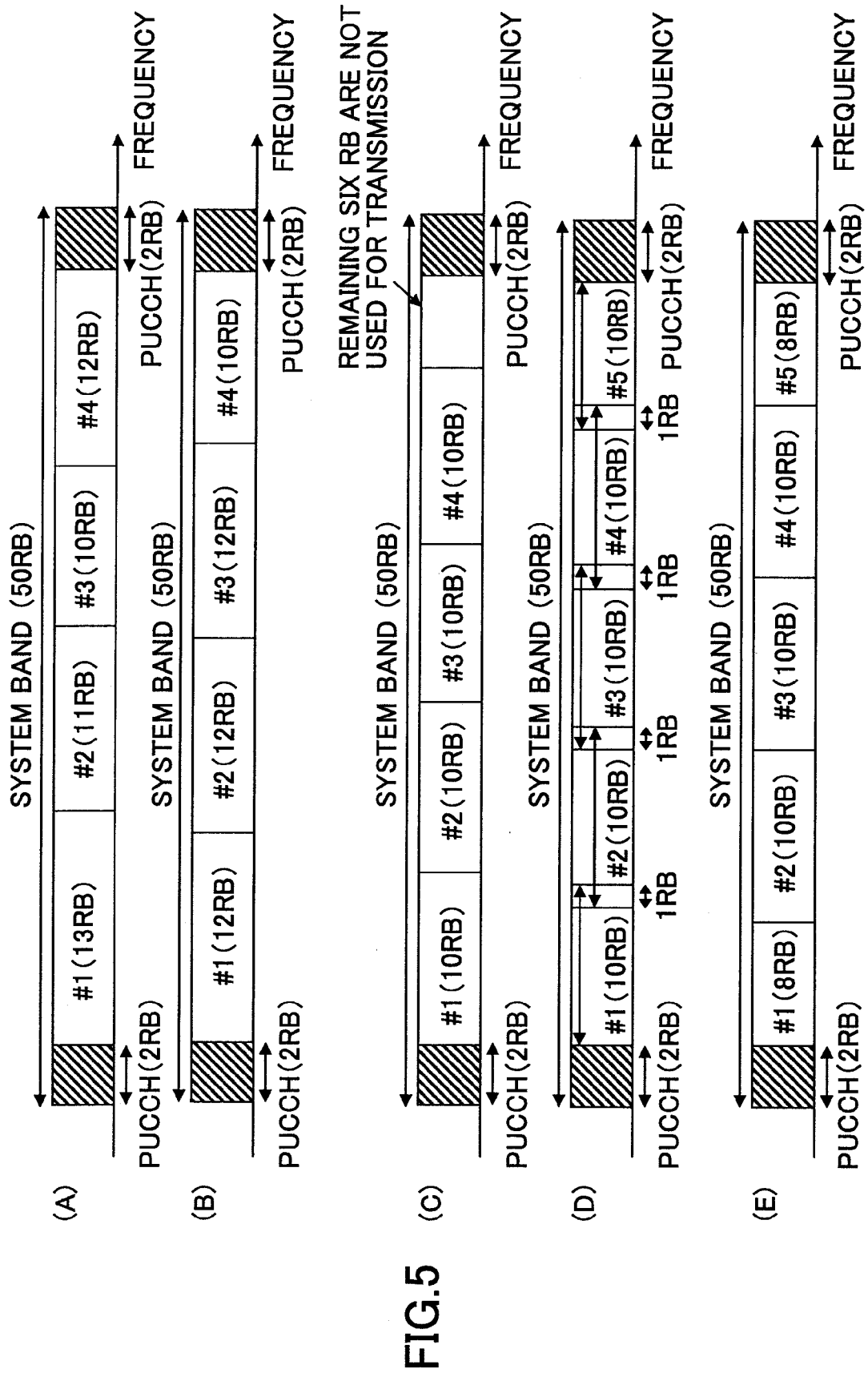
FIG. 5 shows a transmission band for a Sounding RS when a PUCCH is mapped to both ends of the system band according to an embodiment of the present invention.

When the transmission band for the Sounding RS is divided into plural transmission bands, the frequency band except for the frequency bands for the PUCCH may be divided into plural transmission bands, without imposing a limit on the bandwidth for the Sounding RS (allowing for the use of various bandwidths for the Sounding RS). For example, the transmission bands for the Sounding RS may be determined as shown in FIG. 5(A).

Alternatively, the frequency band except for the frequency bands for the PUCCH may be equally divided into plural transmission bands to a maximum extent, with the use of the limited number of bandwidths for the Sounding RS. For example, the transmission bands for the Sounding RS may be determined as shown in FIG. 5(B).

Alternatively, the frequency band except for the frequency bands for the PUCCH may be filled with the fixed bandwidths of the Sounding RS, starting from the low frequency. The remaining frequency band may not be used to transmit the Sounding RS. For example, the transmission bands for the Sounding RS may be determined as shown in FIG. 5(C). In this example, six resource blocks are not used to transmit the Sounding RS.

Alternatively, the transmission bands for the Sounding RS may be overlapped in part so as to avoid the remaining frequency band. For example, the transmission bands for the Sounding RS may be determined as shown in FIG. 5(D). In this example, the transmission bands overlap at boundaries between #1 and #2, #2 and #3, #3 and #4, and #4 and #5.

Alternatively, the frequency band including the frequency bands for the PUCCH, i.e., the system band may be equally divided into plural transmission bands to a maximum extent and portions which overlap with the frequency bands for the PUCCH may not be used to transmit the Sounding RS. For example, the transmission bands for the Sounding RS may be determined as shown in FIG. 5(E). In this example, eight RBs in transmission bands #1 and #5 are used to transmit the Sounding RS, since part of the transmission bands overlaps with the frequency bands for the PUCCH. On the other hand, ten RBs in transmission bands #2, #3, and #4 are used to transmit the Sounding RS, since the transmission bands do not overlap with the frequency bands for the PUCCH.

The SIR (Signal-to-Interference ratio) for an adjacent RB or an immediately preceding RB in which the Sounding RS is transmitted is used in place of the SIR for the RB in which the Sounding RS is not transmitted.

In addition, the Sounding RS is transmitted with the frequency band which does not include the frequency band for the PRACH (the Sounding RS is transmitted with the frequency band to which the PRACH is not mapped or allocated).

Figure 6:
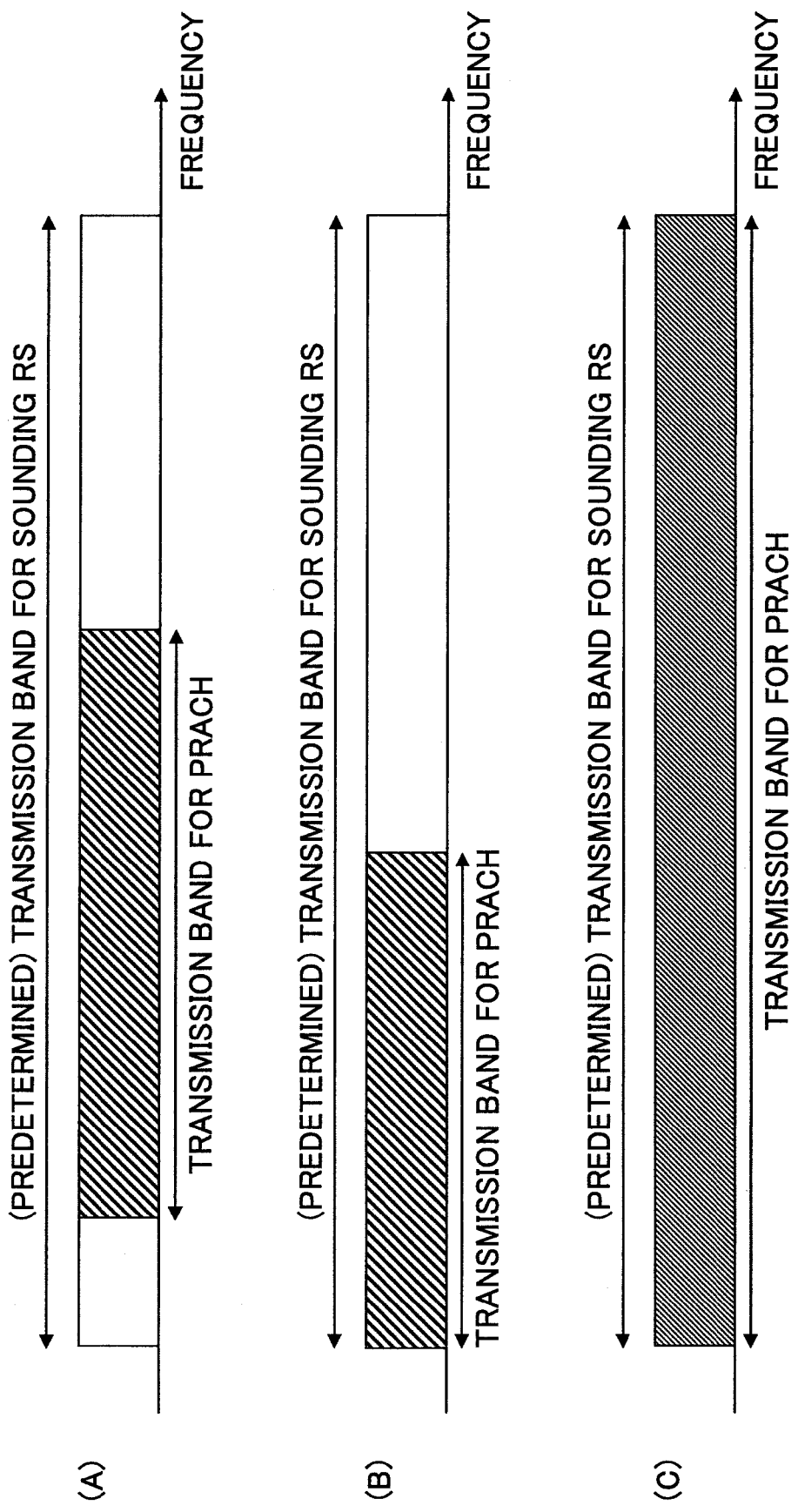
FIG. 6 shows a transmission band for a Sounding RS when a PRACH is mapped to the transmission band for the Sounding RS according to an embodiment of the present invention.

As shown in FIG. 6(A), when the frequency band for the PRACH is included in the predetermined frequency band for the Sounding RS, a larger frequency band selected from two frequency bands except for the frequency band for the PRACH may be used as the transmission band for the Sounding RS, for example. When two frequency bands except for the frequency band for the PRACH are identical, a lower frequency band may be used as the transmission band for the Sounding RS.

Alternatively, as shown in FIG. 6(B), when the frequency band for the PRACH is partly included in the predetermined frequency band for the Sounding RS, the frequency band except for the frequency band for the PRACH may be used as the transmission band for the Sounding RS.

Alternatively, as shown in FIG. 6(C), when the frequency band for the PRACH is wholly included in the predetermined frequency band for the Sounding RS, the Sounding RS may not be transmitted.

Alternatively, when at least part of the frequency band for the PRACH is included in the predetermined frequency band for the Sounding RS, the Sounding RS may not be transmitted.

Figure 7:
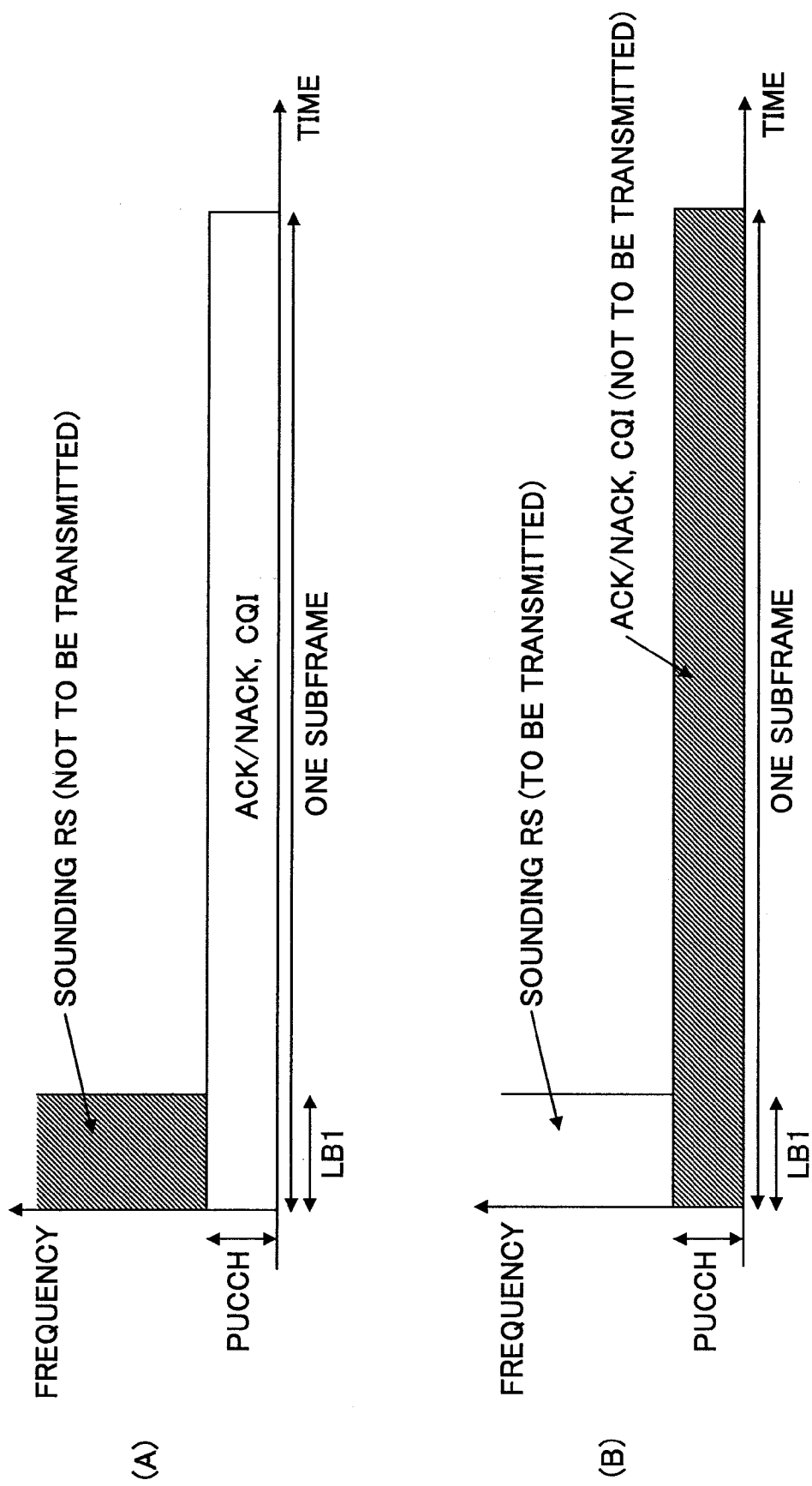
FIG. 7 shows a first diagram illustrating a transmission scheme for a PUCCH and a Sounding RS according to an embodiment of the present invention.

As shown in FIG. 7(A), when both a control signal to be transmitted on the PUCCH and the Sounding RS have transmission opportunities in the same subframe, the mobile station (UE) may transmit only the control signal without transmitting the Sounding RS. Namely, the mobile station (UE) prioritizes transmission of the control signal. In other words, in a subframe in which both transmission timing for the control signal on the PUCCH and transmission timing for the Sounding RS are provided, the mobile station (UE) may transmit only the control signal without transmitting the Sounding RS, as shown in FIG. 7(A). For example, the control signal to be transmitted on the PUCCH includes CQI, HARQ ACK information, Scheduling Request, or the like. Alternatively, the control signal may include both CQI and HARQ ACK information.

Alternatively, as shown in FIG. 7(B), when both a control signal to be transmitted on the PUCCH and the Sounding RS have transmission opportunities in the same subframe, the mobile station (UE) may transmit only the Sounding RS without transmitting the control signal. Namely, the mobile station (UE) prioritizes transmission of the Sounding RS. In other words, in a subframe in which both transmission timing for the control signal on the PUCCH and transmission timing for the Sounding RS are provided, the mobile station (UE) may transmit only the Sounding RS without transmitting the control signal, as shown in FIG. 7(B). For example, the control signal to be transmitted on the PUCCH includes CQI, HARQ ACK information, Scheduling Request, or the like. Alternatively, the control signal may include both CQI and HARQ ACK information.

Figure 8:
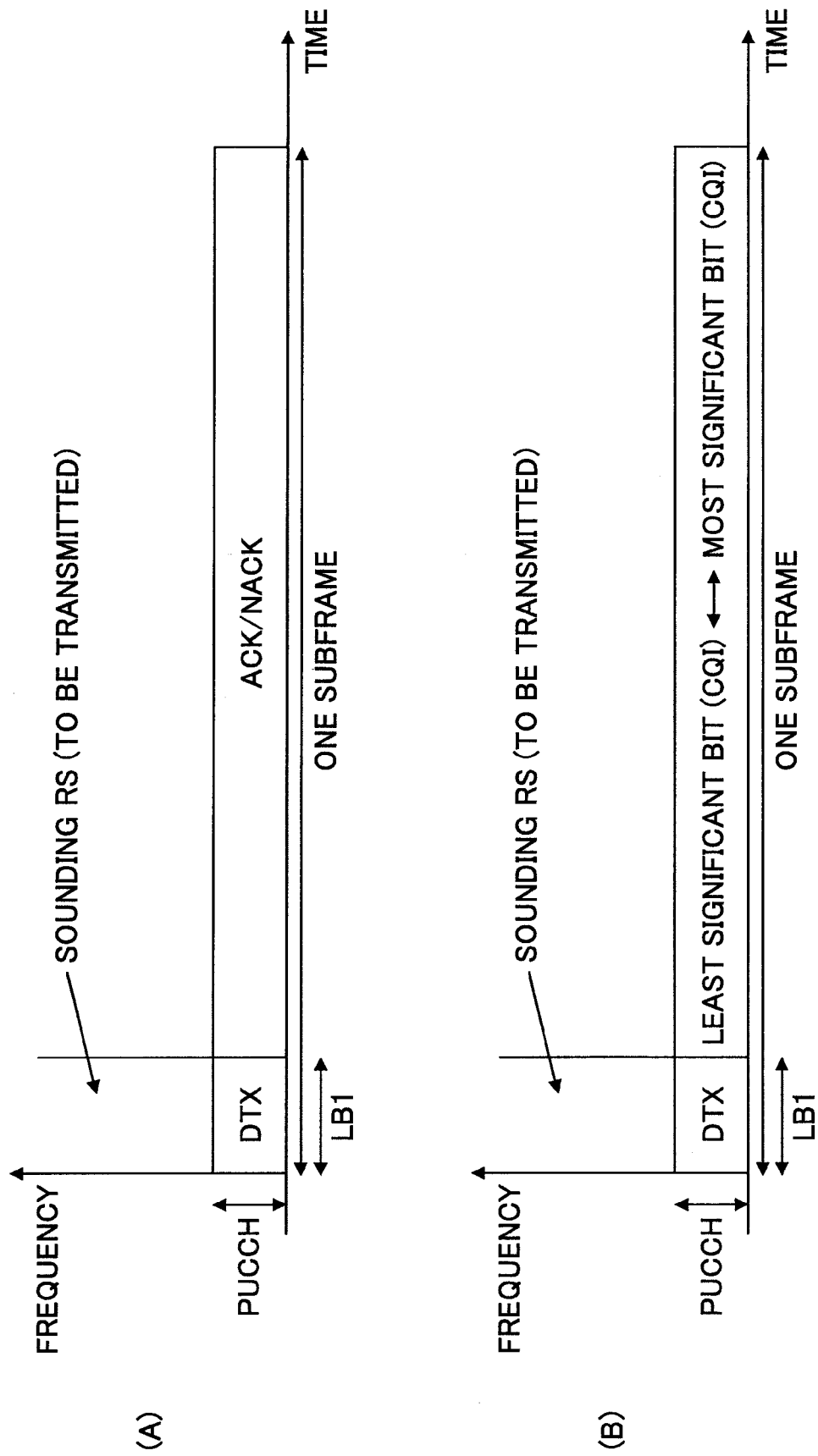
FIG. 8 shows a second diagram illustrating a transmission scheme for a PUCCH and a Sounding RS according to an embodiment of the present invention.

Alternatively, as shown in FIGS. 8 ((A) and (B)), when both a control signal to be transmitted on the PUCCH and the Sounding RS have transmission opportunities in the same subframe, the mobile station (UE) may transmit the Sounding RS without transmitting the control signal in the LB in which the Sounding RS is transmitted. The mobile station (UE) may transmit the control signal in LBs in which the Sounding RS is not transmitted. In other words, in a subframe in which both transmission timing for the control signal on the PUCCH and transmission timing for the Sounding RS are provided, the mobile station (UE) may transmit only the Sounding RS without transmitting the control signal in the LB in which the Sounding RS is transmitted and transmit the control signal in LBs in which the Sounding RS is not transmitted.

Although the LB in which the Sounding RS is transmitted is LB #1 in FIGS. 8 ((A) and (B)), the Sounding RS may be transmitted in LBs other than the LB #1.

Referring to FIG. 8(A), operations in the mobile station are explained below in detail. In FIG. 8(A), the control signal to be transmitted on the PUCCH is HARQ ACK information. In this example, the signal for HARQ ACK information is not transmitted in the LB #1 (undergoes DTX (discontinuous transmission)).

Referring to FIG. 8(B), operations in the mobile station are explained below in detail. In FIG. 8(B), the control signal to be transmitted on the PUCCH is CQI. In this example, the signal for CQI to be mapped to the LB #1 may be the least significant bit for the CQI. The least significant bit is a bit in a lowest position among five bits for CQI, for example. Mapping the least significant bit for CQI to the LB in which the Sounding RS is transmitted in this manner can reduce property degradation of CQI, even though the least significant bit is not transmitted.

Figure 9:
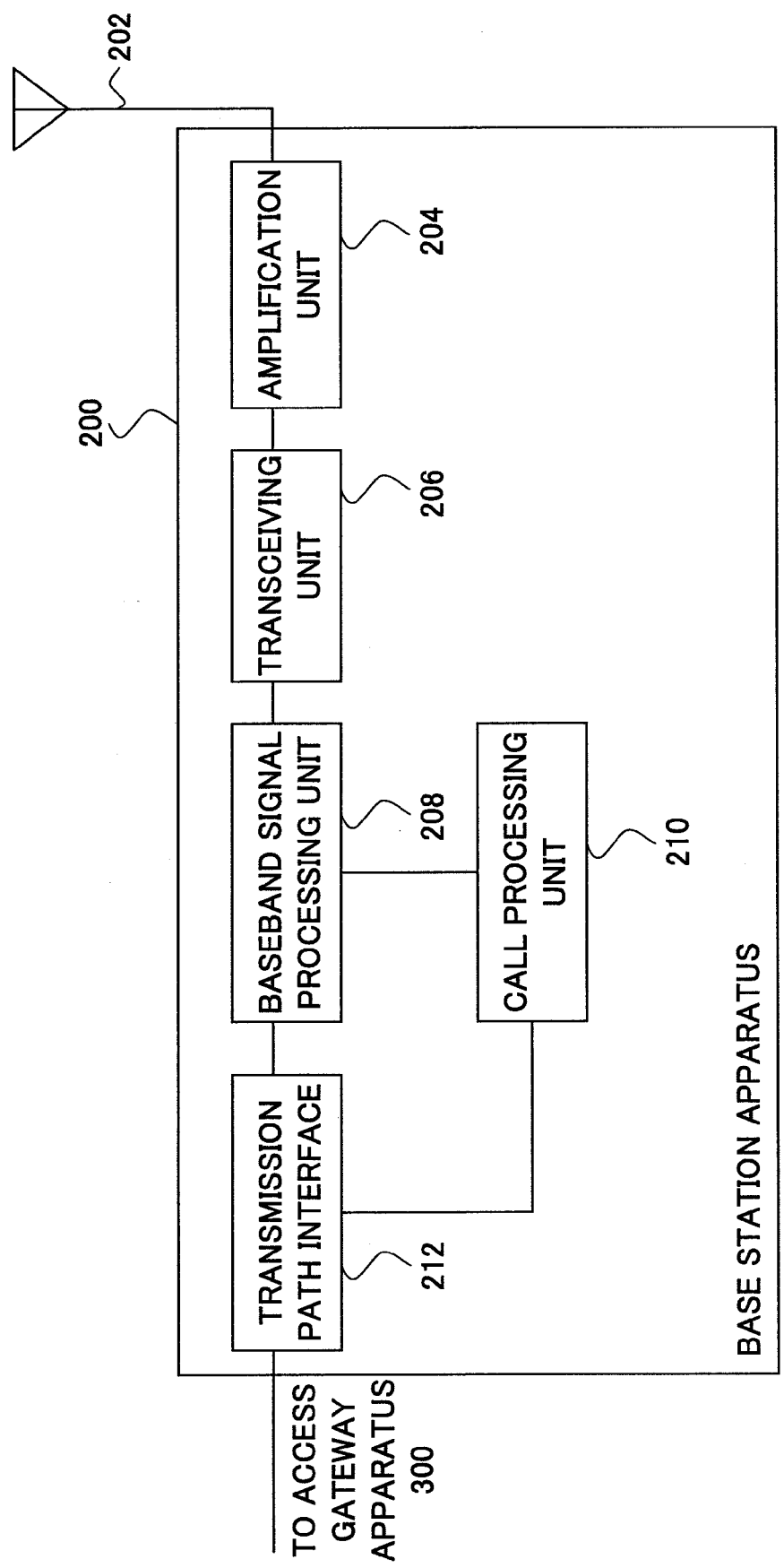
FIG. 9 shows a partial block diagram illustrating a base station apparatus according to an embodiment of the present invention.

Next, the base station apparatus 200 according to an embodiment of the present invention is explained below with reference to FIG. 9.

The base station apparatus 200 according to this embodiment includes a transceiving antenna 202, an amplification unit 204, a transceiving unit 206, a baseband signal processing unit 208, a call processing unit 210, and a transmission path interface 212.

Packet data to be transmitted from the base station apparatus 200 to the mobile station $100_n$ through downlink are input to the baseband signal processing unit 208 from the upper layer station, for example, the access gateway apparatus 300 associated with the base station apparatus 200 via the transmission path interface 212.

In the baseband signal processing unit 208, the packet data undergoes segmentation/concatenation, Radio Link Control (RLC) layer transmission processing such as RLC retransmission control, MAC retransmission control, for example, transmission processing of Hybrid Automatic Repeat request (HARQ), scheduling, transmission format selection, channel coding, and Inverse Fast Fourier Transform (IFFT) processing, and then is forwarded to the transceiving unit 206.

In the transceiving unit 206, the baseband signal output from the baseband signal processing unit 208 undergoes frequency conversion processing for converting the baseband signal to a radio frequency signal, which is then amplified by the amplification unit 204 and transmitted from the transceiving antenna 202.

On the other hand, regarding data transmitted from the mobile station $100_n$ to the base station apparatus 200 in uplink, the radio frequency signal received by the transceiving antenna 202 is amplified by the amplification unit 204, frequency-converted into a baseband signal by the transceiving unit 206, and input to the baseband signal processing unit 208.

In the baseband signal processing unit 208, the input baseband signal undergoes FFT (Fast Fourier Transform) processing, error correction decoding, reception processing for the MAC retransmission control, RLC layer reception processing, and is forwarded to the access gateway apparatus 300 via the transmission path interface 212.

In the baseband signal processing unit 208, the control signal received on the PUCCH, which is included in the input baseband signal, also undergoes demodulation and decoding. In a subframe in which both reception timing for the control signal on the PUCCH and reception timing for the Sounding RS are provided, the baseband signal processing unit 208 in the base station apparatus 200 receives the control signal and/or the Sounding RS, conforming to the transmission scheme of the control signal and/or the Sounding RS in the radio communication system 1000 as described with reference to FIGS. 7 and 8. For example, the control signal received on the PUCCH includes CQI, HARQ ACK information, Scheduling Request, or the like. Alternatively, the control signal may include both CQI and HARQ ACK information.

Also, the baseband signal processing unit 208 in the base station apparatus 200 receives the Sounding RS based on mapping information of the PUCCH and the PRACH. Specifically, the baseband signal processing unit 208 receives the Sounding RS in the transmission band for the sounding RS for the mobile station $100_n$, which is determined based on the mapping information of the PUCCH and the PRACH. The transmission band for the Sounding RS and the scheme for receiving the Sounding RS conform to the transmission band and the transmission scheme in the radio system 1000 as described with reference to FIGS. 5, 6, 7, and 8. The baseband signal processing unit 208 receives information about the frequency bands for the PUCCH and the PRACH from the call processing unit 210.

The call processing unit 210 performs status management of the base station apparatus 200 and management of radio resources.

The call processing unit 210 determines the frequency bands for the PUCCH and the PRACH. The call processing unit 210 also provides information about the frequency bands for the PUCCH and the PRACH to the mobile station $100_n$ in the cell 50 on the broadcast channel, for example. Alternatively, the frequency bands for the PUCCH and the PRACH may be defined in advance as a predetermined parameter in the radio communication system 1000.

The call processing unit 210 also provides the information about the frequency bands for the PUCCH and the PRACH to the baseband signal processing unit 208.

Figure 10:
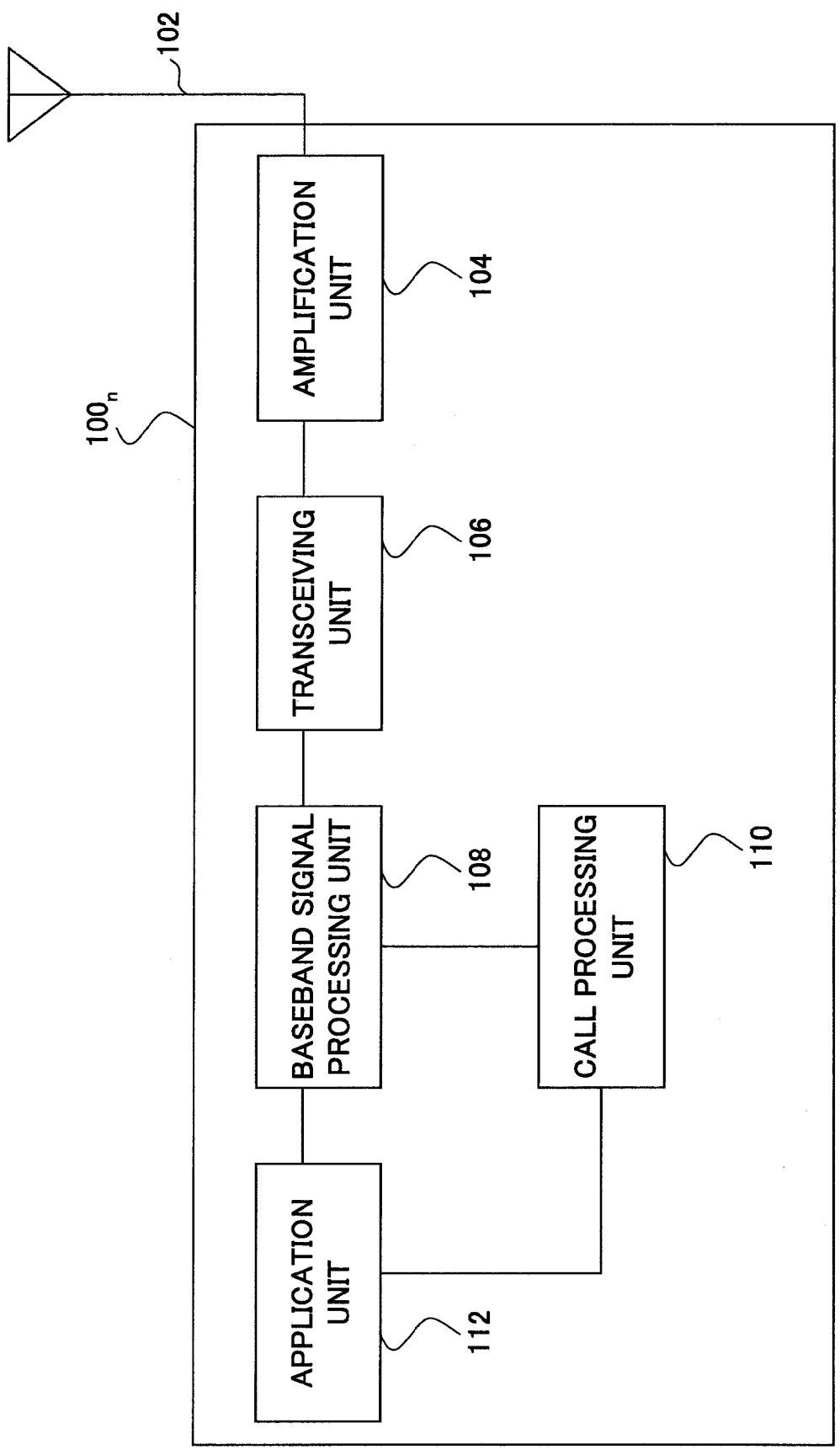
FIG. 10 shows a partial block diagram illustrating a mobile station according to an embodiment of the present invention.

Next, the mobile station $100_n$ according to an embodiment of the present invention is explained below with reference to FIG. 10.

The mobile station $100_n$ includes a transceiving antenna 102, an amplification unit 104, a transceiving unit 106, a baseband signal processing unit 108, a call processing unit 110, and an application unit 112.

Regarding downlink data, a radio frequency signal received by the transceiving antenna 102 is amplified by the amplification unit 104, and frequency-converted into a baseband signal by the transceiving unit 106. The baseband signal undergoes FFT processing, error correction decoding, reception processing for the retransmission control, and so on, and is forwarded to the application unit 112.

On the other hand, uplink packet data are input from the application unit 112 to the baseband signal processing unit 108. In the baseband signal processing unit 108, the uplink packet data undergoes transmission processing for the retransmission control (Hybrid ARQ (H-ARQ)), transmission format selection, channel coding, Inverse Fast Fourier Transform (IFFT) processing, and so on, and is forwarded to the transceiving unit 106.

The baseband signal processing unit 108 performs transmission processing of the control signal on the PUCCH. In a subframe in which both transmission timing for the control signal on the PUCCH and transmission timing for the Sounding RS are provided, the baseband signal processing unit 108 in the mobile station $100_n$ transmits the control signal and/or the Sounding RS, conforming to the transmission scheme of the control signal and/or the Sounding RS in the radio communication system 1000 as described with reference to FIGS. 7 and 8. For example, the control signal transmitted on the PUCCH includes CQI, HARQ ACK information, Scheduling Request, or the like. Alternatively, the control signal may include both CQI and HARQ ACK information.

In the transceiving unit 106, the baseband signal output from the baseband signal processing unit 108 undergoes frequency conversion processing for converting the baseband signal to a radio frequency signal, which is then amplified by the amplification unit 104 and transmitted from the transceiving antenna 102.

In addition, the baseband signal processing unit 108 demodulates and decodes information on a DL L1/L2 control channel to retrieve the information on the DL L1/L2 control channel.

The baseband signal processing unit 108 also receives information about the frequency bands for the PUCCH and the PRACH from the call processing unit 110. The baseband signal processing unit 108 generates the Sounding RS based on the transmission band for the Sounding RS, which is determined based on the frequency bands for the PUCCH and the PRACH. The generated Sounding RS is transmitted via the transceiving unit 106, the amplification unit 104, and the transceiving antenna 102 to the base station apparatus 200. The transmission band for the Sounding RS and the scheme for transmitting the Sounding RS conform to the transmission band and the transmission scheme in the radio system 1000 as described with reference to FIGS. 5, 6, 7, and 8. The baseband signal processing unit 108 receives information about the frequency bands for the PUCCH and the PRACH from the call processing unit 110.

The call processing unit 110 performs management of communications with the base station apparatus 200. The application unit 112 performs processing on an upper layer higher than the physical layer and the MAC layer.

The call processing unit 110 also receives information on the broadcast channel via the transceiving antenna 102, the amplification unit 104, the transceiving unit 106, and the baseband signal processing unit 108, and then retrieves information about the frequency bands for the PUCCH and the PRACH on the broadcast channel. The call processing unit 110 provides the information about the frequency bands for the PUCCH and the PRACH to the baseband signal processing unit 108.

Although the mobile station 100$_n$ retrieves information about the frequency bands for the PUCCH and the PRACH on the broadcast channel, the mobile station 100$_n$ may know in advance the information about the frequency bands for the PUCCH and the PRACH as a predetermined parameter in the radio communication system 1000.

Figure 11:
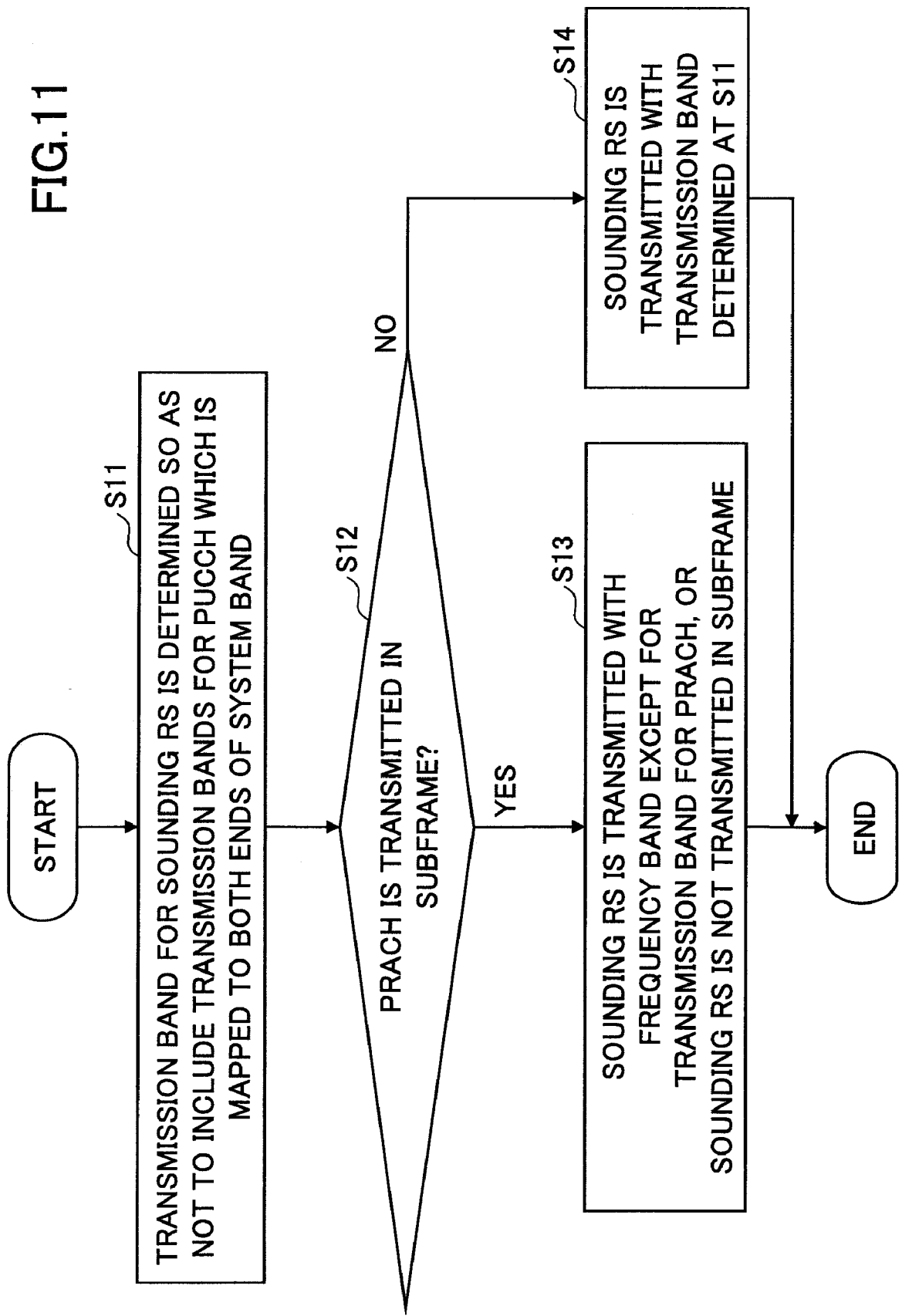
FIG. 11 shows a flowchart illustrating a communication control method according to an embodiment of the present invention.

Next, a communication control method for transmitting the Sounding RS in the radio communication system 1000 according to the embodiment of the present invention is explained below with reference to FIG. 11.

The transmission band for the Sounding RS is determined based on mapping information of the PUCCH and the PRACH.

The transmission band for the Sounding RS is determined so as not to include (overlap) the transmission bands for the PUCCH, which is mapped to both ends of the system band (step S11). The transmission band for the Sounding RS conforms to the transmission band in the radio system 1000 as described with reference to FIGS. 5 and 6.

It is determined whether the PRACH is transmitted in this (current) subframe (the subframe corresponding to the determined transmission band) (step S12).

When the PRACH is transmitted in the subframe (step S12: YES), the Sounding RS is transmitted with the frequency band except for the transmission band for the PRACH. Alternatively, the Sounding RS is not transmitted in the subframe (step S13). How to avoid using the transmission band for the PRACH conforms to the explanation of the transmission band for the Sounding RS in the radio communication system 1000 as described with reference to FIGS. 5 and 6.

When the PRACH is not transmitted in the subframe (step S12: NO), the Sounding RS is transmitted with the transmission band determined at step S11 (step S14).

Although the transmission band for the Sounding RS is determined based on mapping information of both the PUCCH and the PRACH, the transmission band for the Sounding RS may be determined based on mapping information of either the PUCCH or the PRACH.

For example, the mapping information corresponds to information about which frequency band or which resource block a signal uses for transmission. Namely, the mapping information corresponds to the transmission band for the signal.

Figure 12:
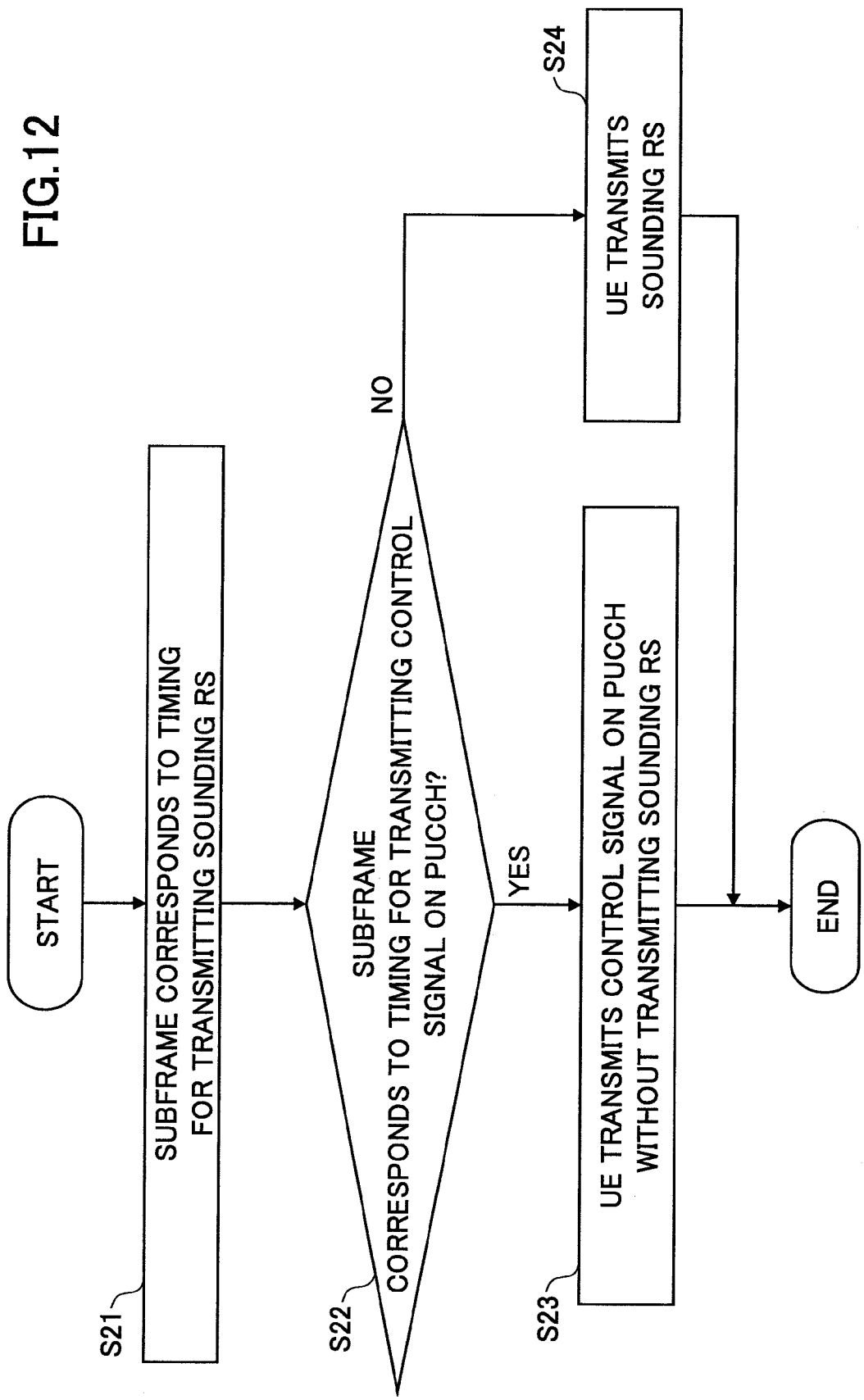
FIG. 12 shows a flowchart illustrating a communication control method according to an embodiment of the present invention.

Next, a communication control method for transmitting the control signal on the PUCCH and the Sounding RS in the radio communication system 1000 according to the embodiment of the present invention is explained below with reference to FIG. 12.

This (current) subframe corresponds to timing for transmitting the Sounding RS (step S21).

If the subframe corresponds to timing for transmitting the control signal on the PUCCH (step S22: YES), the mobile station (UE) transmits the control signal on the PUCCH without transmitting the Sounding RS (step S23).

If the subframe does not correspond to timing for transmitting the control signal on the PUCCH (step S22: NO), the mobile station (UE) transmits the Sounding RS (step S24).

Figure 13:
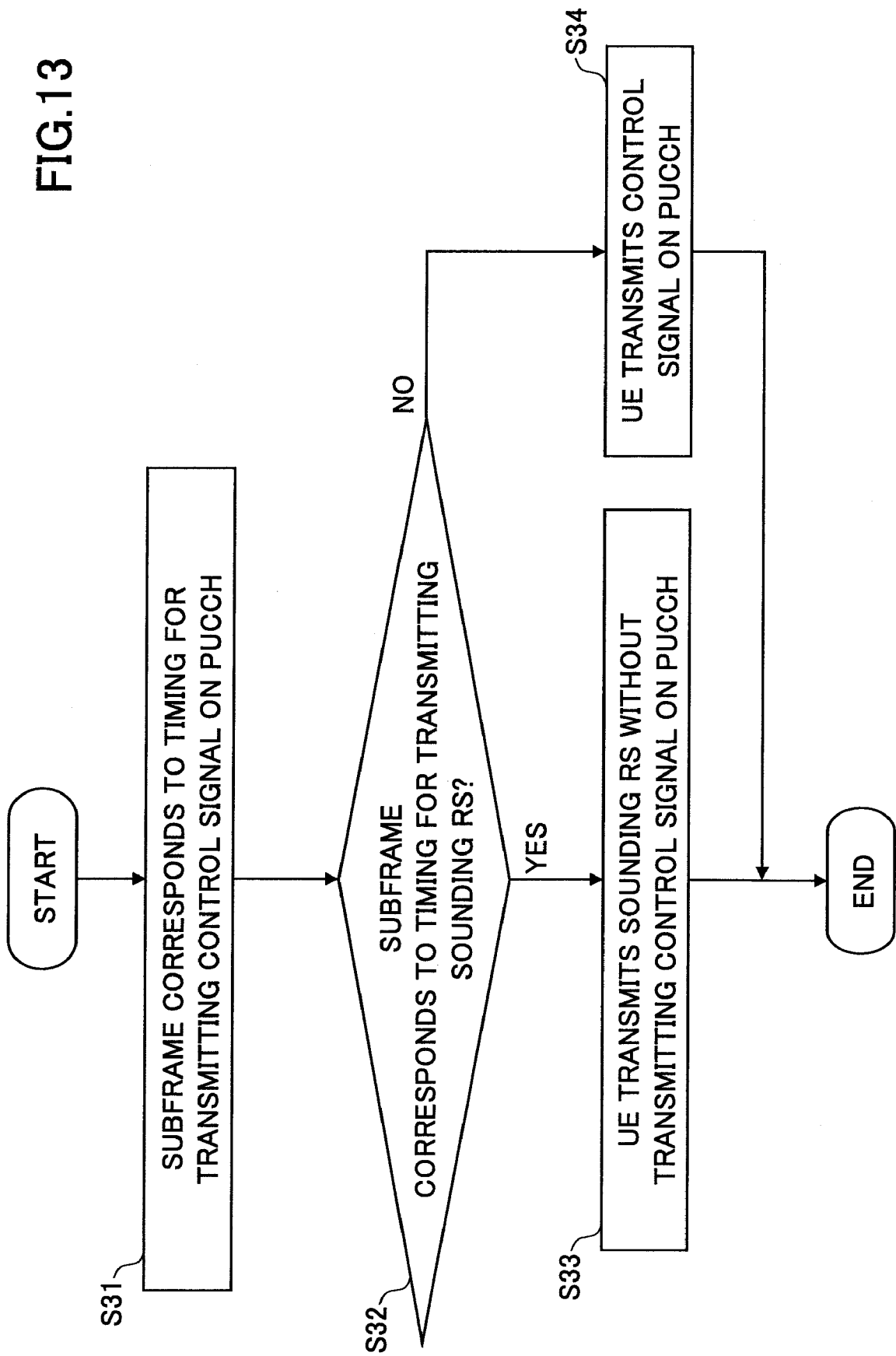
FIG. 13 shows a flowchart illustrating a communication control method according to an embodiment of the present invention.

Next, another communication control method for transmitting the control signal on the PUCCH and the Sounding RS in the radio communication system 1000 according to the embodiment of the present invention is explained below with reference to FIG. 13.

This (current) subframe corresponds to timing for transmitting the control signal on the PUCCH (step S31).

If the subframe corresponds to timing for transmitting the Sounding RS (step S32: YES), the mobile station (UE) transmits the Sounding RS without transmitting the control signal on the PUCCH (step S33).

At step S33, the mobile station may transmit the control signal in the LB in which the Sounding RS is not transmitted. The transmission scheme for the control signal conforms to the transmission scheme for the control signal and/or the Sounding RS in the radio communication system 1000 as described with reference to FIGS. 7 and 8.

If the subframe does not correspond to timing for transmitting the Sounding RS (step S32: NO), the mobile station (UE) transmits the control signal on the PUCCH (step S34).

According to an embodiment of the present invention, a base station apparatus, a mobile station, a radio communication system, and a communication control method are achieved, in which transmission of the Sounding RS is appropriately controlled when the transmission band for the Sounding RS overlaps with the transmission bands for the PUCCH and the PRACH.

This international application claims the benefit of the priority dates of Japanese Patent Application No. 2007-035526 filed on Feb. 15, 2007 and Japanese Patent Application No. 2007-077900 filed on Mar. 23, 2007, the entire content of which is herein incorporated hereby by reference.

The invention claimed is:

1. A radio communication system including a mobile station and a base station apparatus for communicating with the mobile station according to a SC-FDMA (Single-Carrier Frequency Division Multiple Access) scheme in uplink, the mobile station comprising:
   a transmitting unit configured to transmit at least one of an uplink control channel (PUCCH) to be frequency-multiplexed with an uplink shared channel (PUSCH) and a random access channel (PRACH); and
   a Sounding RS transmitting unit configured to determine a transmission band for a Sounding Reference Signal (Sounding RS) based on mapping information of at least one of the PUCCH and the PRACH.

2. The radio communication system as claimed in claim 1, wherein:
   the Sounding RS transmitting unit avoids using at least one of a transmission band for the PUCCH and a transmission band for the PRACH to transmit the Sounding RS.

3. The radio communication system as claimed in claim 1, wherein:
   a SIR (Signal-to-Interference ratio) for an adjacent RB (Resource block) or an immediately preceding RB in which the Sounding RS is transmitted is used in place of a SIR for a RB in which the Sounding RS is not transmitted.

4. A radio communication system including a mobile station and a base station apparatus for communicating with the mobile station according to a SC-FDMA scheme in uplink, wherein:
   a Sounding RS is not transmitted, when all or part of a transmission band for the Sounding RS overlaps all or part of a transmission band for an uplink control channel (PUCCH) to be frequency-multiplexed with an uplink shared channel (PUSCH) or a random access channel (PRACH).

5. The radio communication system as claimed in claim 4, wherein:
   a SIR (Signal-to-Interference ratio) for an adjacent RB (Resource block) or an immediately preceding RB in which the Sounding RS is transmitted is used in place of a SIR for a RB in which the Sounding RS is not transmitted.

6. A base station apparatus in a radio communication system including a mobile station and the base station apparatus for communicating with the mobile station according to a SC-FDMA scheme in uplink, comprising:
   a receiving unit configured to receive an uplink control channel (PUCCH) to be frequency-multiplexed with an uplink shared channel (PUSCH) and a random access channel (PRACH);
   a Sounding RS receiving unit configured to receive a Sounding RS whose transmission band is determined based on mapping information of the PUCCH and the PRACH.

7. The base station apparatus as claimed in claim 6, wherein:
   CQI and/or HARQ ACK information is transmitted on the PUCCH.

8. A base station apparatus in a radio communication system including a mobile station and the base station apparatus for communicating with the mobile station according to a SC-FDMA scheme in uplink, comprising:
   a receiving unit configured to receive either an uplink control channel (PUCCH) to be frequency-multiplexed with an uplink shared channel (PUSCH) or a Sounding Reference Signal (Sounding RS) when reception opportunities for the PUCCH and the Sounding RS are provided in a same subframe.

9. The base station apparatus as claimed in claim 8, wherein:
   CQI and/or HARQ ACK information is transmitted on the PUCCH.

10. A base station apparatus in a radio communication system including a mobile station and the base station apparatus for communicating with the mobile station according to a SC-FDMA scheme in uplink, comprising:
   a receiving unit configured to receive part of an uplink control channel (PUCCH) to be frequency-multiplexed with an uplink shared channel (PUSCH) and a Sounding Reference Signal (Sounding RS) when reception opportunities for the PUCCH and the Sounding RS are provided in a same subframe.

11. The base station apparatus as claimed in claim 10, wherein:
   the part of the PUCCH corresponds to SC-FDMA symbols other than symbols for receiving the Sounding RS.

12. The base station apparatus as claimed in claim 10, wherein:
   CQI and/or HARQ ACK information is transmitted on the PUCCH.

13. A mobile station in a radio communication system including the mobile station and a base station apparatus for communicating with the mobile station according to a SC-FDMA scheme in uplink, comprising:
   a transmitting unit configured to transmit an uplink control channel (PUCCH) to be frequency-multiplexed with an uplink shared channel (PUSCH) and a random access channel (PRACH); and
   a Sounding RS transmitting unit configured to transmit a Sounding RS whose transmission band is determined based on mapping information of the PUCCH and the PRACH.

14. The mobile station as claimed in claim 13, wherein:
   CQI and/or HARQ ACK information is transmitted on the PUCCH.

15. A mobile station in a radio communication system including the mobile station and a base station apparatus for communicating with the mobile station according to a SC-FDMA scheme in uplink, comprising:
   a transmitting unit configured to transmit either an uplink control channel (PUCCH) to be frequency-multiplexed with an uplink shared channel (PUSCH) or a Sounding Reference Signal (Sounding RS) when transmission opportunities for the PUCCH and the Sounding RS are provided in a same subframe.

16. The mobile station as claimed in claim 15, wherein:
   CQI and/or HARQ ACK information is transmitted on the PUCCH.

17. A mobile station in a radio communication system including the mobile station and a base station apparatus for communicating with the mobile station according to a SC-FDMA scheme in uplink, comprising:
   a transmitting unit configured to transmit part of an uplink control channel (PUCCH) to be frequency-multiplexed with an uplink shared channel (PUSCH) and a Sounding Reference Signal (Sounding RS) when transmission opportunities for the PUCCH and the Sounding RS are provided in a same subframe.

18. The mobile station as claimed in claim 17, wherein:
   the part of the PUCCH corresponds to SC-FDMA symbols other than symbols for receiving the Sounding RS.

19. The mobile station apparatus as claimed in claim 17, wherein:
   CQI and/or HARQ ACK information is transmitted on the PUCCH.

20. A communication control method in a radio communication system including a mobile station and a base station apparatus for communicating with the mobile station according to a SC-FDMA scheme in uplink, comprising the steps of:
   determining, by the mobile station, a frequency band for a Sounding RS based on mapping information of an uplink control channel (PUCCH) to be frequency-multiplexed with an uplink shared channel (PUSCH) and a random access channel (PRACH); and
   transmitting, by the mobile station at least one of the PUCCH, the PRACH, and the Sounding RS.

* * * * *